US012552919B2

(12) United States Patent
Yurovskaya

(10) Patent No.: US 12,552,919 B2
(45) Date of Patent: Feb. 17, 2026

(54) VULCANIZATION PROCESS FOR RUBBER PRODUCTS

(71) Applicant: Irina S. Yurovskaya, Corpus Christi, TX (US)

(72) Inventor: Irina S. Yurovskaya, Corpus Christi, TX (US)

( * ) Notice: Subject to any disclaimer, the term of this patent is extended or adjusted under 35 U.S.C. 154(b) by 712 days.

(21) Appl. No.: 17/931,143

(22) Filed: Sep. 12, 2022

(65) Prior Publication Data

US 2023/0085729 A1 Mar. 23, 2023

Related U.S. Application Data

(60) Provisional application No. 63/299,176, filed on Jan. 13, 2022, provisional application No. 63/245,986, filed on Sep. 20, 2021.

(51) Int. Cl.
| | |
|---|---|
| *C08J 3/24* | (2006.01) |
| *C08K 13/02* | (2006.01) |
| *C08L 9/02* | (2006.01) |
| *C08L 23/16* | (2006.01) |
| *B29C 35/02* | (2006.01) |

(52) U.S. Cl.
CPC ............ *C08L 9/02* (2013.01); *C08K 13/02* (2013.01); *C08L 23/16* (2013.01); *B29C 35/02* (2013.01); *C08J 3/244* (2013.01); *C08J 3/245* (2013.01)

(58) Field of Classification Search
None
See application file for complete search history.

(56) References Cited

U.S. PATENT DOCUMENTS

| | | | |
|---|---|---|---|
| 2,938,100 A | * | 5/1960 | Gibbs ................ B29C 35/0288 425/29 |
| 9,701,821 B2 | | 7/2017 | Papakonstantopoulos et al. |
| 2008/0066839 A1 | | 3/2008 | Sandstrom et al. |

FOREIGN PATENT DOCUMENTS

JP 50136020 A * 10/1975

OTHER PUBLICATIONS

Veksli, Z. et al., "Different Spatial Heterogeneity of Networks Prepared By a Two Stage Irradiation of Natural Rubber". Radiat. Phys. Chem. vol. 51, No. 2, pp. 207-213, 1998. (Year: 1998).*
Anonymous, "The Vanderbilt Rubber Handbook," R.T. Vanderbilt Compnay, Inc., 44-347 (1978).
Eirich, F.R., "Science and Technology of Rubber," Rubber Division of the American Chemical Society, 7, p. 292 (1978).
Horve, L, "Shaft Seals for Dynamic Applications (Mechanical Engineering)," CRC Press, (1996).
Klüppel, M., et al., "Network Structure and Mechanical Properties of Sulfur-Cured Rubbers," Macromolecules 27(13): 35963603 (1994).

(Continued)

*Primary Examiner* — Richard A. Huhn
(74) *Attorney, Agent, or Firm* — Houston Hogle LLP

(57) ABSTRACT

A process for preparing a rubber article involves modifying the crosslinking density in one region of the article relative to another region of the article. The modification can be carried out by increasing or decreasing the energy transferred to the first region relative to the energy transferred to the second region during vulcanization. In one implementation, the process is conducted in a mold. Rubber parts described have two or more regions that differ from one another with respect to their crosslinking density.

9 Claims, 11 Drawing Sheets

(56) References Cited

OTHER PUBLICATIONS

Lake, G.J., et al., "The Strength of Highly Elastic Materials," Proc. of the Royal Society of London, Series A, Math. and Phys. Sciences, 300(1460):108 (1967).

Lawandy, S.N., et al., "Effect of Vulcanizing System on the Crosslink Density of Nitrile Rubber Compounds," Journal of Applied Polymer Science, 96(6): 2440-2445 (2005).

Mars, W.V., et al, "Infinite Life Design Principles for Rubber Structures," Spring 198th Technical Meeting of the Rubber Division of the American Chemical Society, Inc. Cleveland, Ohio, Apr. 27-29, 2021, ISSN: 1547-1977 (2021).

Mok, K.L., et al., "Characterisation of Crosslinks in Vulcanised Rubbers: From Simple to Advanced Techniques," Malaysian Rubber Board, 2017, https://iupac.org/cms/wp-content/uploads/2017/12/IUPAC_PolymEdu_Shortcourse_9ppt_AikHweeEng.pdf.

Rader, C.P., "Basic Elatomer Technology," Ed. By K. Baranwal, ACS Rubber Division, p. 170 (2001).

* cited by examiner

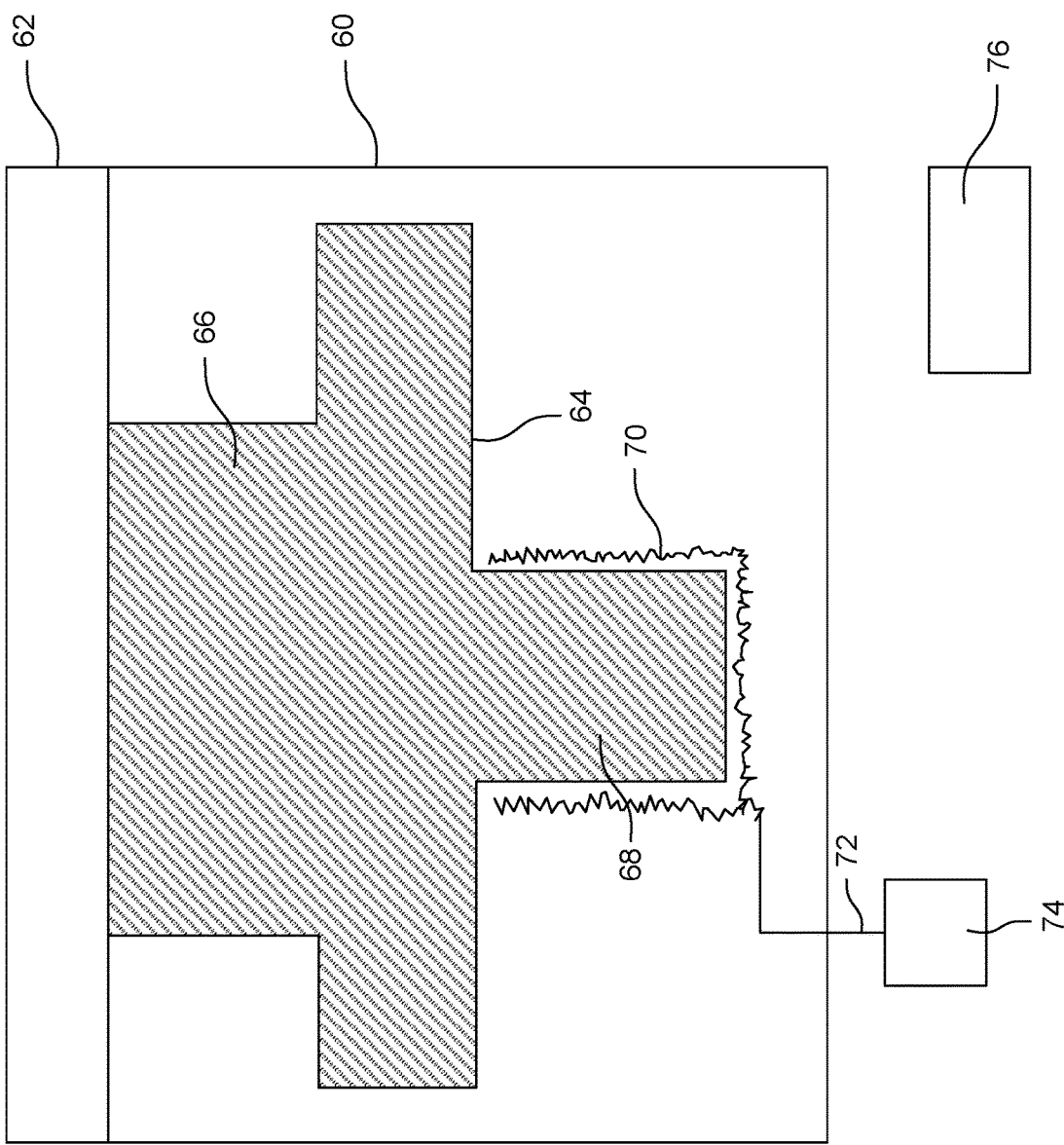

VULCANIZATION PROCESS FOR RUBBER PRODUCTS

RELATED APPLICATIONS

This application claims the benefit under 35 USC 119(e) of U.S. Provisional Application No. 63/245,986, filed on Sep. 20, 2021, and U.S. Provisional Application No. 63/299,176, filed on Jan. 13, 2022, both of which are incorporated herein by reference in their entirety.

BACKGROUND OF THE INVENTION

Rubber is an elastomeric type of polymer, having the ability to return to its original shape after being stretched or deformed. It presents a unique combination of features characterizing solids (constant shape), liquids (large elongation) and gases (resilience increase with temperature, entropic nature of deformation); this combination of features is being termed viscoelasticity. See, for example, J. Aklonis, W. MacKnight, Introduction to Polymer Viscoelasticity, p. 109, Willey-Interscience publication, 1983; M. Ashby, Materials Selection in Mechanical Design, Elsevier, 2011, p. 33.

Whereas materials such as metals possess well-defined mechanical characteristics, properties of rubber, due to its viscoelastic nature, depend to a high degree on any number of manufacturing details and conditions. Also, due to its viscoelasticity, the design of a rubber part can involve relatively complex specifications and testing relative to plastics or metals. For instance, while for other materials it may be enough to specify a tensile strength, for rubbers, not only the tensile strength, but stresses for elongations of 100%, 200%, 300%, etc., often need to be provided as well. See for example ASTM D412-16(2021), Standard Test Methods for Vulcanized Rubber and Thermoplastic Elastomers—Tension, ASTM International, West Conshohocken, PA, 2021, www.astm.org; and ASTM D638-14, Standard Test Method for Tensile Properties of Plastics, ASTM international, West Conshohocken, PA, 2014, www.astm.org.

Some techniques have been developed for preparing articles (vehicular tires) that display a crosslink distribution that is obtained by using distinct crosslink promoting additives, e.g., CPA(1) and CPA(2), as disclosed, for instance in U.S. Pat. No. 9,701,821 B2.

U.S. Patent Application Publication No. 2008066839A1 (to P. H. Sandstrom) describes a multilayer tire tread in which different layers have different desired properties that are obtained by using different compositions. The fabrication process requires the separate manufacture of individual layers, followed by assembling the thread, which is then vulcanized.

SUMMARY OF THE INVENTION

With rubber parts being used in a vast number of applications, consumer goods, equipment, processes and so forth, the (premature) wear or failure of a rubber component, even one as simple as an O-ring, can have serious consequences, cascading into more generalized malfunctions, causing premature and unwanted discards, process shutdowns or bottlenecks.

A need exists, therefore, for rubber articles that can better withstand demands placed on them during service. Also needed are rubber articles that present properties aligned with a specific service environment, affecting a specific region of the article.

During service, a rubber article may include at least one region that is subjected to a dynamic deformation, while at least one other region serves under different, e.g., static conditions. Aspects of the invention aim at producing an article in which at least one region of the article displays properties that differ from those characterizing at least one other region of the rubber article.

Approaches described herein relate to methods of producing rubber parts in which the crosslinking density (a property characteristic to rubber) in one region differs from the crosslinking density in another region. In some implementations an article exhibits different crosslinking densities in two different regions of the article. In others, more than two regions (e.g., three or more) differ from one another with respect to crosslinking density. In some cases, the only difference between one region and another region is the crosslinking density.

Techniques for preparing a rubber article can relate to increasing or decreasing the crosslinking density in a first region of the article relative to a second region of the rubber article. In some embodiments, the rubber article is prepared in integral form, from a single uncured rubber composition. The crosslinking density can be increased or decreased intentionally, e.g., by selecting appropriate fabrication conditions, during vulcanization, for example. Some approaches rely on increased heating of one region relative to another. A non-uniform microwave field or other types of electromagnetic radiation also can be employed to preferentially heat one region relative to another. Further approaches focus on providing less energy to regions for which the desired crosslinking density is lower than in another region.

While the crosslinking density will vary within the article, many of the rubber parts described herein are characterized by a chemical composition that is the same in all regions. As used herein, terms denoting the same rubber or polymer composition typically refer to compositions containing the same materials (polymers, additives (including, for instance, curing promoters), etc.), in the same relative amounts. Other embodiments, such as those that involve 3D printing, for example, can rely on changing the polymer composition itself, as layers are deposited to generate distinct crosslinking densities.

The crosslinking density can be tailored to impart a desired property in one portion of the article. Another crosslinking density, different from the first, can characterize another portion of the article. In some cases, a further crosslinking density (different from the ones already mentioned) can be provided in yet another region of the article. Thus, the degree of crosslinking can be modified (increased or reduced) according to desired properties across a rubber part or demands placed on sections of the part during service (use). In specific embodiments, the crosslinking density is increased as more energy is transferred to the system during vulcanization, a process typically conducted in the presence of a crosslinking agent, often sulfur. In one example, at least part of the vulcanization process takes place in a mold.

In more detail, one aspect of the invention features a process for preparing a rubber article. In one embodiment, the process comprises selecting fabrication conditions to increase or decrease the crosslinking density in a first region of the rubber article relative to a second region of the article, wherein the first region and the second region are prepared from the same rubber composition, using the same curing system.

In another embodiment the process includes: curing an elastomeric composition in a mold or extruding the elastomeric composition through a die, wherein the mold or the die includes a first section and a second section; and supplying more energy to the first section than to the second section, thereby producing a rubber article having a crosslinking density that is higher in a first region formed in the first section than in a second region formed in the second section.

In a further embodiment, the process comprises: coextruding a rubber composition and a removable insulating tape to form an extrudate covered with the removable insulating tape; conveying the extrudate covered with the removable insulating tape to a salt bath; and removing the removable insulating tape to produce a rubber article having a lower crosslinking density in the area that had been covered by the removable insulating tape.

In yet another embodiment, the process includes: evaluating a control rubber article to determine a first region exposed to a first service environment and a second region exposed to a second service environment; modifying the crosslinking density in the first region relative to the second region to obtain a rubber article having a first rubber property in the first region and a second rubber property in the second region, wherein modifying the crosslinking density in the first region relative to the second region is obtained by exposing the first region and the second region to different vulcanization conditions or wherein the process is a 3D printing process.

Another aspect of the invention features a rubber article comprising a first region having a first crosslinking density and a second region having a second crosslinking density, the first crosslinking density being different from the second crosslinking density. In specific implementations, the first region and the second region are produced from a same rubber composition, using a same curing system, for example. In others, the first region and the second region are produced by 3D printing.

Embodiments of the invention can be practiced or adapted for the manufacture of any number of articles, made of different types of rubber and aimed at various applications. Approaches described herein can lead to higher service life of the rubber parts, increasing fatigue resistance or abrasion resistance where needed, while maintaining hardness, low compression set, etc. in other sections of the part. Thus, rubber articles can be tailored or custom designed, creating the needed margin of safety in bottleneck operation segments, while lowering the compound consumption and the weight of the part, eliminating not needed margin in the non-bottleneck areas.

Rubber mixing, extrusion, calendering, parts assembly and/or other manufacturing operations can be simplified by reducing the number of compounds used in some existing production methods for making multilayer products such as hoses, belts and tires. Simplification of the manufacturing process and elimination of certain stages can lead to lower costs, lower energy and lower labor consumption.

In contrast to some existing techniques (see, e.g., U.S. Pat. No. 9,701,821 B2), specific embodiments described herein can use the same crosslinking system curative, additives, elastomer, reinforcing materials, etc., typically in the same relative amounts. Thus, the rubber article can be prepared in integral form, with all its regions being made from the same uncured composition. For some implementations, the only parameter or condition that is varied to obtain different crosslinking densities is the temperature reached in different regions of the composition during processing (cure).

In contrast to an approach such as that set forth in U.S. Patent Application Publication No. 2008066839A1 (in which a multilayer tire tread is produced by the separate preparation of individual layers, followed by assembling the thread, which is then vulcanized), embodiments described herein can yield similar results, while using a single composition for an entire rubber article, in a much simplified and less expensive fabrication process.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 7 is cross sectional view of a mold configured to impart certain properties in a certain region of a rubber part;

DETAILED DESCRIPTION OF THE PREFERRED EMBODIMENTS

Figure 1:
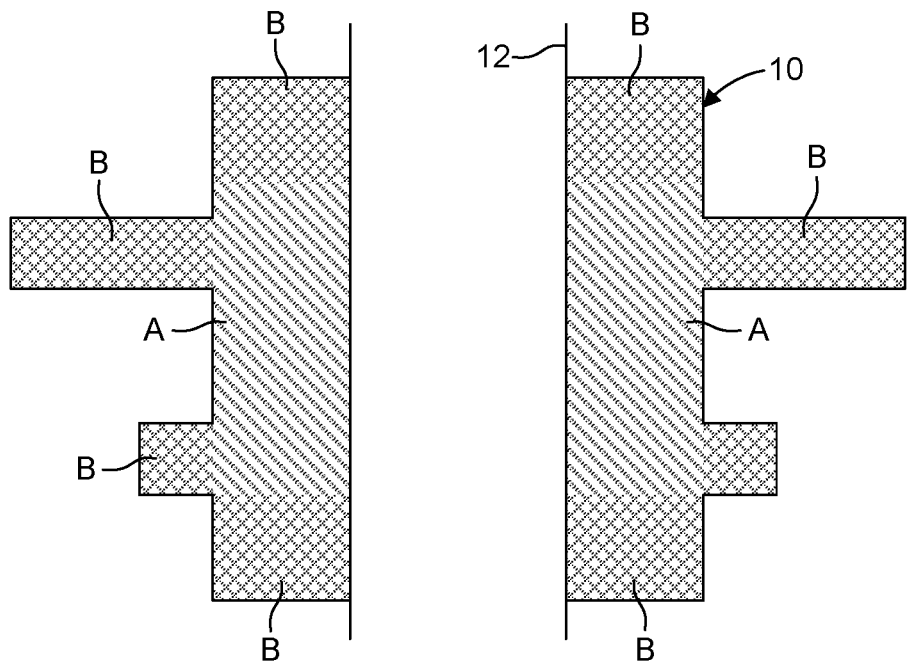
FIG. 1 is a cross sectional view of a grommet characterized by regions subjected to distinct service conditions.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Also, all conjunctions used are to be understood in the most inclusive sense possible. Thus, the word "or" should be understood as having the definition of a logical "or" rather than that of a logical "exclusive or" unless the context clearly necessitates otherwise. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention addresses inadequacies or even failures encountered with some rubber articles (also referred to herein as "parts", "profiles", or "products") and can be practiced with any number of rubber types, including natural rubbers (NR), polyisoprene rubber, styrene butadiene rubber (SBR), ethylene propylene diene monomer (EPDM), polychloroprene (Neoprene), acrylonitrile butadiene rubber, polyacrylic rubber, ethylene acrylic rubber, butyl rubber, silicone rubber, fluoroelastomers, fluorosilicone elastomers and others. Some applications of the invention, using 3D printing, for instance, can be practiced with rubber-like (also referred to herein as "rubber") elastomeric materials such as polyurethanes or others, as currently known or as developed in the future.

The rubber article can be an end product or merely a segment, layer or subpart of an end product. The article can be, for instance, a whole gasket or O-ring. It can also be just a layer or segment that is laminated or otherwise affixed to another component (which too can be made of rubber) to form a larger object. In many of the embodiments described herein the rubber article (whether representing the entire end product or just a part thereof) is manufactured as a whole, using the same rubber composition throughout. In some cases, further discussed below, the rubber article can be formed using different rubber compositions.

During service, a certain portion, section, area, surface, edge, point, etc. (collectively referred to herein as "region") of the article may be subjected to one environment, a set of external forces, for instance, while another portion of the article may experience different conditions, e.g., other forces or even no forces. Furthermore, a rubber product, for instance a product that targets a specific application, may benefit from presenting certain properties in one region and different properties in another.

In some of its aspects, the invention relates to a method for preparing a rubber part in which at least one region is characterized by different properties when compared to at least one other region. In many embodiments, specific regions in the article are tailored or customized to display desired properties, e.g., to meet different demands placed on them during use. This is typically carried out during the vulcanization (cure) step performed in the manufacture of the rubber article.

In general, rubber articles are prepared from rubber compositions that can be compounded by methods known in the art. In one example, a diene-based elastomer is combined with materials such as, for example, vulcanization ingredients, e.g., sulfur, zinc oxide, activators, peroxides, retarders and accelerators; plasticizers and processing additives, e.g., oils, waxes, resins including tackifying resins; fillers, as carbon black, silica, clay, calcium carbonate, etc., pigments, antioxidants and antiozonants, peptizing agents. Depending on the intended application, the various constituents can be selected and used in conventional amounts or amounts to be determined by routine experimentation, prior experience, and so forth.

Antioxidants, for example, can be included in an amount within a range of from about 0 to about 5 parts per hundred rubber (phr), as taught in *The Vanderbilt Rubber Handbook* (1978), pages 344 through 346. Examples of antiozonant(s) and waxes, particularly microcrystalline waxes, when used, may be selected from the type shown in The Vanderbilt Rubber Handbook (1978), pages 346 and 347. If utilized, antiozonants may be provided in amounts of about 1 to about 5 phr. Sulfur can be used in the amount of 0 to 10 phr, accelerators can be used within the range of 0.1 to 5 phr. Zinc oxide can be used in the range of 0 to 5 phr. Fillers can be used in the range of 0 to 700 phr. Plasticizers can be used in the range of 0 to 300 phr.

In addition to the specifics of the formulation being employed (the nature of the rubber material, recipe, additives, relative amounts, etc.), the manufacture of rubber parts can involve many other variables, including the mixing techniques and/or equipment, specific vulcanization chemistry (e.g., with sulfur, peroxides or other means), relaxation between manufacturing stages, specific vulcanization technology and/or equipment as (press, autoclave, microwave, X-rays and/or others), as known in the art.

During vulcanization, polymer chains of the elastomer employed in the rubber compound are converted into more durable compositions by chemical reactions of curatives, which modify the polymer by forming crosslinks (bridges) between individual polymer chains. In many cases, the curative system involves elemental sulfur (free sulfur) or sulfur-donating vulcanizing agents. A typical sulfur curing system, for example, can contain not only the curing agent (sulfur and donors), but also accelerators, employed to control the vulcanization time at a certain temperature (e.g., sulfenamides, thiazols, guanidines, thiurams, etc.) and activators (ZnO, stearic acid, etc.). In many processes, sulfur-vulcanizing agents are provided in an amount ranging from about 0.5 to about 5 phr, e.g., from 1.5 to 2.3 phr.

While sulfur systems are perhaps the most common, especially for NR, SBR or BR, other curing formulations are available. Examples include peroxides, metallic oxides, resins, bisphenols, diamines, and others.

Also to be considered is the specific vulcanization method being selected, from processes such as: molding in a mold, in a press, between flat plates in a press, autoclave curing, continuous extrusion with vulcanization in liquids or air, techniques that employ microwaves, high energy radiation, or others. In general, many if not all these processes involve transfer of energy (often heat) from the environment or tool employed to the rubber compound. See, e.g., M. Morton, Rubber Technology, Van Norstrand Co, NY 1987; The Vanderbilt Rubber Handbook, 13th edition, 1990.

The various factors noted above can affect product properties in many different ways. However, a correlation often can be established between rubber attributes and crosslinking density, a parameter characterizing rubber materials. Crosslinking density can be defined as the number of crosslinks per volume. It is inversely related to molecular weight between crosslinks, $M_c$. Crosslinks can be quantitated or estimated by techniques such as swelling in solvents. Indirect assessments of crosslinking densities can be made by measuring one or more physical properties known to be affected by it. See, for example, *Characterisation of Crosslinks in Vulcanised Rubbers: From Simple to Advanced Techniques*, K. L. Mok and A. H. Eng, Malaysian Rubber Board, 2017, https://iupac.org/cms/wp-content/uploads/2017/12/IUPAC_PolymEdu_Shortcourse_9ppt_AikHweeEng.pdf; C. Rader p. 170 in *Basic Elatomer Technology*, Ed. By K. Baranwal, ACS Rubber Division, 2001.

Although the crosslinking density generally is related to product properties, the level of crosslinking reached affects rubber properties in different ways. For instance, as the crosslinking density increases, hardness increases, hysteresis decreases, fatigue life and tensile strength go through maximums, but the maximums do not coincide. Meanwhile, it is known that, for instance, hysteresis determines the rolling resistance of tires, tensile strength is positively correlated with abrasion resistance, tear resistance is positively correlated with fatigue life, and so forth. See, e.g., A. Y. Coran Vulcanization, p. 292 in Science and Technology of Rubber, Edited by F. R. Eirich, Academic Press, New York, 1978; Lake and Thomas, *Proc. of the Royal Society of London*, Series A, Math. and Phys. Sciences, Vol. 300, No. 1460, Page 108, (1967); Lawandy and Halim, *Journal of Applied Polymer Science*, Vol. 96, Pages 2440 through 2445 (2005); M. Kliippel, G. Heinrich, *Macromolecules* 27, Page 3596 (1994).

Specific embodiments of the invention feature a method in which distinct properties in distinct regions of a rubber part are obtained by modifying (increasing or decreasing) the crosslinking density in a first region of the rubber article relative to a second region of the article. Modifications in the crosslinking density characterizing one region in comparison to another can take place during the cure (vulcanization) process performed to produce the rubber article.

That different regions of a rubber article will encounter different service conditions and/or might benefit from properties distinct from those in other regions of the rubber article may be determined by studying the wear profile or failure of the part (evaluating, for instance, the damaged area in comparison to undamaged or less damaged portions), by modeling calculations, experience, observations of the part during or after use, and so forth. Typically, the part being evaluated for wear, damage, etc. is manufactured conventionally and can be thought of as a "control" or "reference" rubber part (article). One approach is described by W. V. Mars, J. D. Suter, M. A. Bauman, in the presentation *Infinite Life Design Principles for Rubber Structures*, at the Spring 198th Technical Meeting of the Rubber Division of the American Chemical Society, Inc. Cleveland, Ohio, Apr. 27-29, 2021, ISSN: 1547-1977.

In some implementations, it is the same property, hardness, for instance, that is increased in a first region and decreased in a second region. Other implementations benefit from increasing (or decreasing) a property (i) in one region and increasing (or decreasing) a different property (ii) in another region. In one example, improved stiffness may be desired in region I while retaining fatigue resistance may be desired in region II.

Once the demands or desired properties associated with specific regions of the rubber article are established, the vulcanization process is controlled to obtain higher or lower crosslinking densities for at least one specific region relative to another. In general, regions characterized by good fatigue resistance and wear, good abrasion resistance (i.e., optimal tensile strength), soft working surfaces or surfaces that can provide some friction can be obtained by approaches that decrease the crosslinking density in those regions. On the other hand, regions of high static modulus and hardness, added stiffness, low friction resistance or low compression set can be obtained by increasing the crosslinking density.

The crosslinking density can be increased by increasing the amount of energy (e.g., heat) transferred to one (first) region of a rubber composition being cured, relative to another (second) region. In one embodiment, a region for which higher crosslinking is desired is heated to a higher temperature. In another embodiment, lower crosslinking densities are obtained by exposing a region to cooler temperatures during curing.

The high vulcanization temperature, the low vulcanization temperature, and/or the difference between these temperatures can be selected based on routine experimentation, prior experience, modeling, failure analyses and so forth. Factors to be considered include the type of rubber being handled, specifics of the elastomeric composition, specifics of the equipment or techniques being employed to effect the cure, refinements or optimizations of the desired property in a specific region and so forth. Higher or lower temperatures can be maintained for the entire curing operation or for a suitable shorter period. Temperatures can be ramped up, down, and/or held constant in one or more stages, according to a manufacturing protocol.

In one example, the crosslinking density can be enhanced by increasing the curing temperature in a first region by at least 5 degrees centigrade (° C.), relative to a second region. Temperature differences can be within the range of from about 5 to about 50° C., for example: from 5 and 10, 5 to 20, 5 to 30 or 5 to 40° C.; or from 10 to 20, 10 to 30, 10 to 40, 10 to 50° C.; or from 20 to 30, 20 to 40 or 20 to 50° C.; or from 30 to 40 or 30 to 50° C.; or from 40 to 50° C. Values and/or ranges encompassed in the ones specified also can be employed. To illustrate, regions that do not require an enhanced crosslinking density can be cured at the conventional temperature routinely employed in the fabrication process, while a higher temperature, e.g., 12° C., higher is provided to cure regions of higher crosslinking densities.

Principles described herein can be applied or adapted to various methods used to prepare rubber parts. In one embodiment, the article is prepared by molding, a process in which the uncured rubber compound is cured under pressure in a mold in which the rubber compound is heated at different temperatures, according to the crosslinking density desired in specific regions of the product. This approach can be applied to compression, transfer or injection molding processes, for example. In some situations, the cure process can begin before the rubber composition is added to the mold and will typically continue during molding. Fabrication methods other than molding that can incorporate techniques described herein include but are not limited to extrusion with the following continuous vulcanization in air, or salt bath or microwave, autoclave, radiation curing and others.

In one illustrative example, it is established that service conditions encountered by a rubber grommet include a dynamically working region. Exposed to vibrations, this region may benefit from high fatigue resistance, increasing the service life. On the other hand, a high static modulus and hardness may be desirable attributes characterizing a static connecting area of the grommet.

Shown in FIG. 1 is a cross section of grommet 10 arranged around a rotating shaft 12. An analysis such as described by W. V. Mars, J. D. Suter, M. A. Bauman, *Infinite Life Design Principles for Rubber Structures*, presented at the Spring 198th Technical Meeting of the Rubber Division of the American Chemical Society, Inc. Cleveland, Ohio, Apr. 27-29, 2021, ISSN: 1547-1977 may reveal that, during operation, regions A are subjected to vibrational forces; regions B, however, serve under predominantly static conditions. Embodiment of the invention address these differences by imparting a relatively lower crosslinking density, and thus a higher fatigue resistance, in areas exposed to vibrational energy (regions A in FIG. 1), and higher crosslinking densities, for increased static modulus and hardness in static areas (regions B in FIG. 1). In one implementation, grommet 10 is manufactured by providing higher vulcanization temperatures to regions B and relatively lower vulcanization temperatures to regions A.

Figure 2:
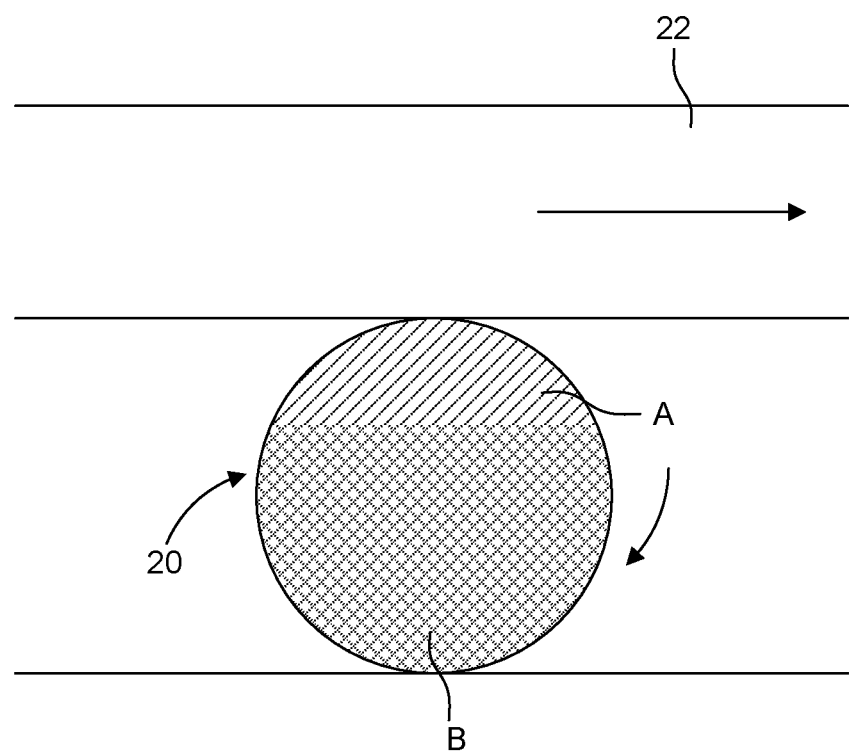
FIG. 2 illustrates a rubber O-ring sealing a transitionally moving shaft and characterized by specific properties in specific areas of the O-ring.

A rubber O-ring such as O-ring 20 in FIG. 2 is dynamically used for a translationally moving shaft 22. The O-ring may need to provide low friction resistance on the dynamically working surface (area A), while providing good fatigue and wear resistance on the opposite surface and in the body (region B). In specific implementations vulcanization conditions for preparing O-ring 20 are tailored to provide higher crosslinking density (e.g., higher vulcanization temperatures) in the low friction resistance on the working surface exposed to dynamic forces (area A) and lower crosslinking density (e.g., lower vulcanization temperatures) for obtaining good fatigue resistance and wear on the opposite surface and in the body of the O-ring.

Figure 3:
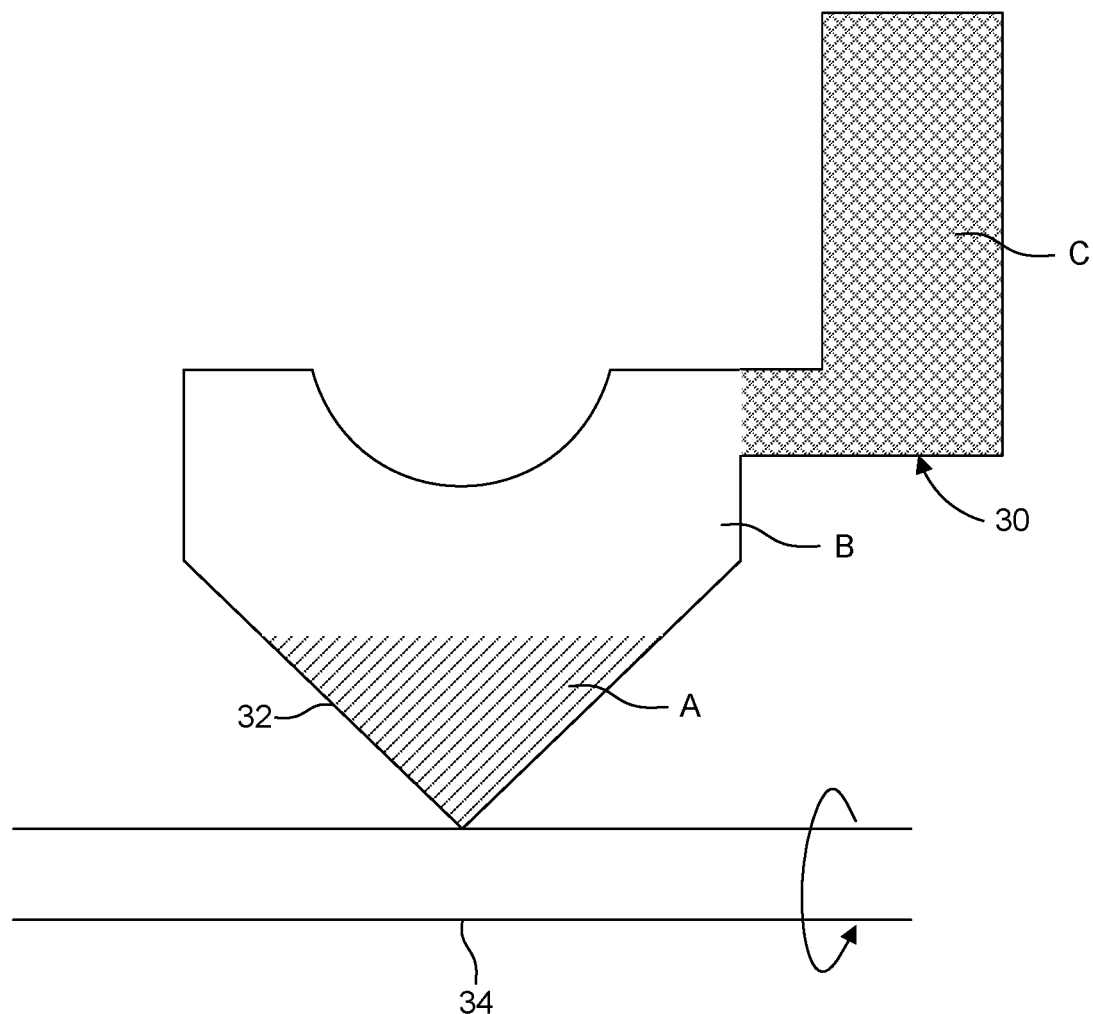
FIG. 3 is an illustration of a section of shaft-seal, designed for sealing a rotationally moving shaft according to embodiments of the invention.

Rotational moving shafts (described, for instance, in Large Rubber Handbook, Volume 2. p. 312, Moscow 2012, ISBN 978-5-89551-025-4; Shaft Seal for Dynamic Applications, by Les Horve, Marcel Dekker, 1996, 107) can include a lip seal that needs to provide good fatigue resistance, i.e., optimum tear strength; other areas of the seal benefit from specified hardness and low compression set. Shown in FIG. 3 is section 30 of a rotationally moving shaft lip seal which includes lip 32 at rotating shaft 34. Lip 32 needs to provide good fatigue resistance and tear resistance in region A, at a lower cross-linking density, while the other areas of the seal need to provide a specified hardness in region B and low compression set at higher cross-linking density (region C).

An extruded profile such as illustrated by part 40 (FIG. 4) may benefit from a softer inner working area 42, to ensure sealing and a harder outer area 44, to facilitate connection to a metal body. Accordingly, a lower extrusion die temperature is provided on the sealing surface (lower crosslinking density, lower hardness, better sealing), while the die temperature of the surface forming outer part of the profile can be higher, to increase hardness of the profile in the area that will be connected to a metal component.

Figure 5:
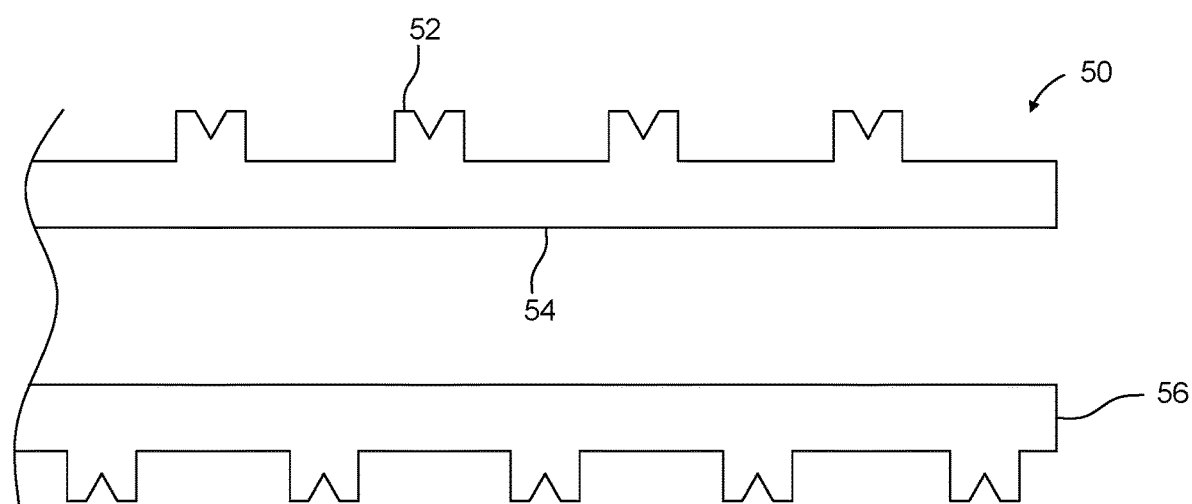
FIG. 5 illustrates a conveyor belt with surfaces that benefit from distinct properties.

In the case of a conveyor belt a rubber top that provides friction will prevent items from sliding around on or even falling off the conveyor belt during movement; other areas of the belt may need a low compression set and high stiffness to ensure proper conveying motion and service. Shown in FIG. 5 is conveyor belt section 50, having upper surface 52 and lower surface 54. To obtain the desired crosslinking density, the upper plate of the molding press or upper surface of a steel band of the rotor-cure can be held at a lower temperature to ensure lower crosslinking density, hence higher friction of the conveyor belt top surface 52, while higher temperatures are provided at surface 56 and lower surface 54, generating higher crosslinking density and thus the desired high stiffness and low compression set.

As already noted, and as illustrated with reference to FIGS. 1 through 5, general trends exist between vulcanizable properties and crosslinking density. Such trends can be understood by consulting existing correlation plots (see, e.g., The Science and Technology of Rubber, Mark, J. E., Erman, B., Eirich, F. R., Ed., Elsevier, New York (2005)). It is also possible to generate such plots by routine experimentation or other approaches.

In practice, a conventional existing fabrication procedure, for making a conventional rubber part (in which the various regions display the same cured rubber property) can be used to determine an initial set of vulcanization conditions for producing a rubber part having an initial crosslinking density (and properties) that characterizes the entire part. Applying trends such as described above, vulcanization conditions, e.g., the cure temperature, can be increased in one region relative to another, to produce prototypes according to principles described herein. The fabrication process can be optimized, e.g., by further adjustments to the temperature differentials employed, based on the performance and/or properties of the prototypes.

In another approach, a correlation between a desired vulcanizable property to be imparted to a specific region of a rubber product relative to another region of the article (the latter being characterized by a different desired property) can involve an evaluation of a plurality (two or more) plots describing various properties of the cured rubber as a function of crosslinking density. Based on these plots, it is then possible to determine relative operational regimes, typically non-overlapping, that can yield desired levels of crosslinking and thus desired properties in specific regions of the article. The interplay of various properties desired within a single rubber piece can be illustrated with reference to FIGS. 6A, 6B, 6C, and 6D.

Figure 6A:
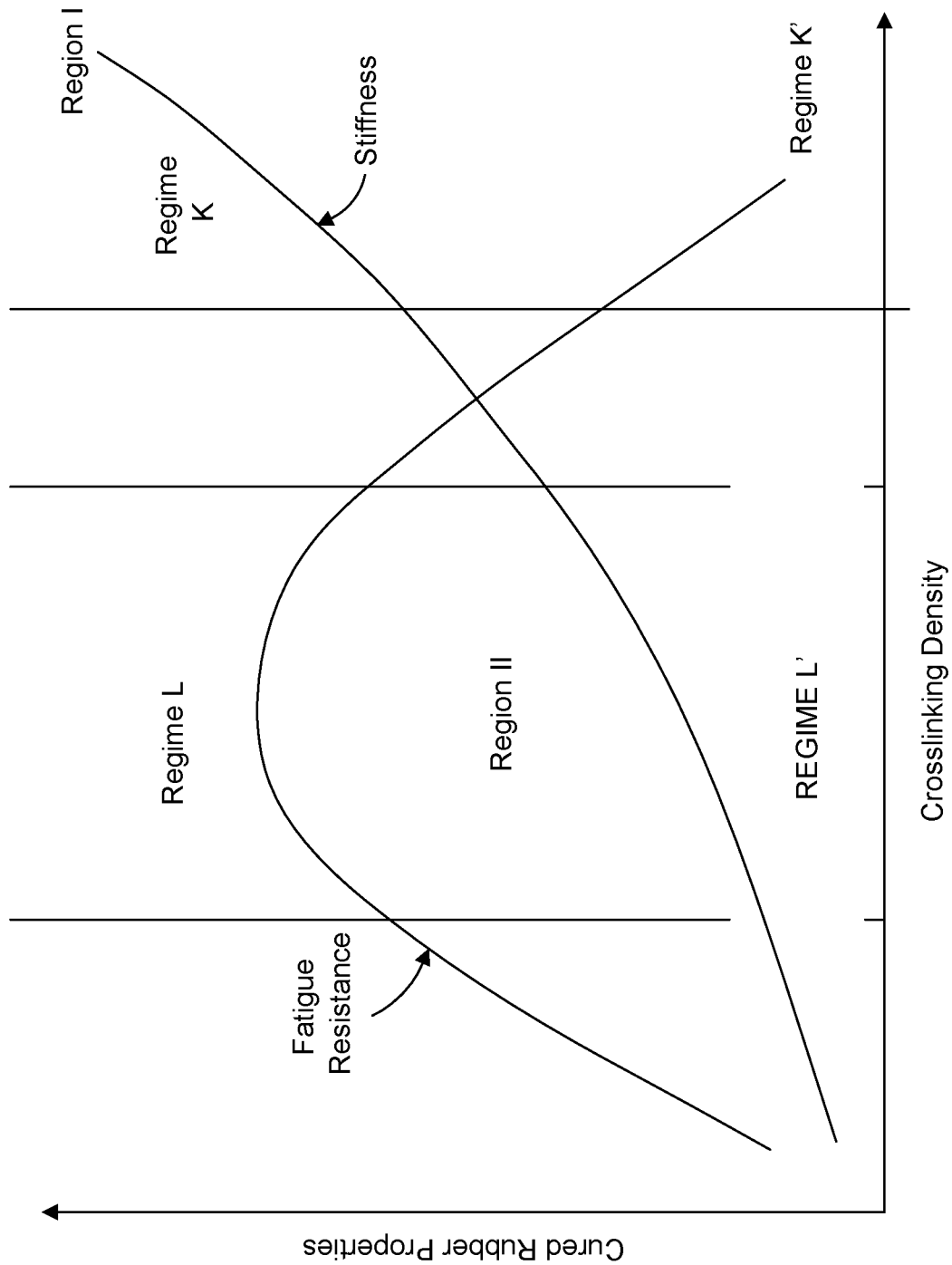
FIG. 6A presents plots of two cured rubber properties, stiffness and fatigue resistance, as a function of crosslinking density.

Shown in FIG. 6A, for instance, are two plots, each presenting a specific property (in this case stiffness and fatigue resistance) of cured rubber as a function of crosslinking density. A rubber part in which region I has increased stiffness, illustrated by regime K on the stiffness curve, can be prepared by imparting a relatively high crosslinking density (regime K' on the horizontal axis). On the other hand, the plot for fatigue resistance presents a maximum (see regime L on the fatigue resistance curve). To enhance fatigue resistance in region II of the article will require a lower crosslinking density (regime L' on the horizontal axis). Translated to process conditions, the input of energy during vulcanization will be higher in region I relative to region II.

Figure 6B:
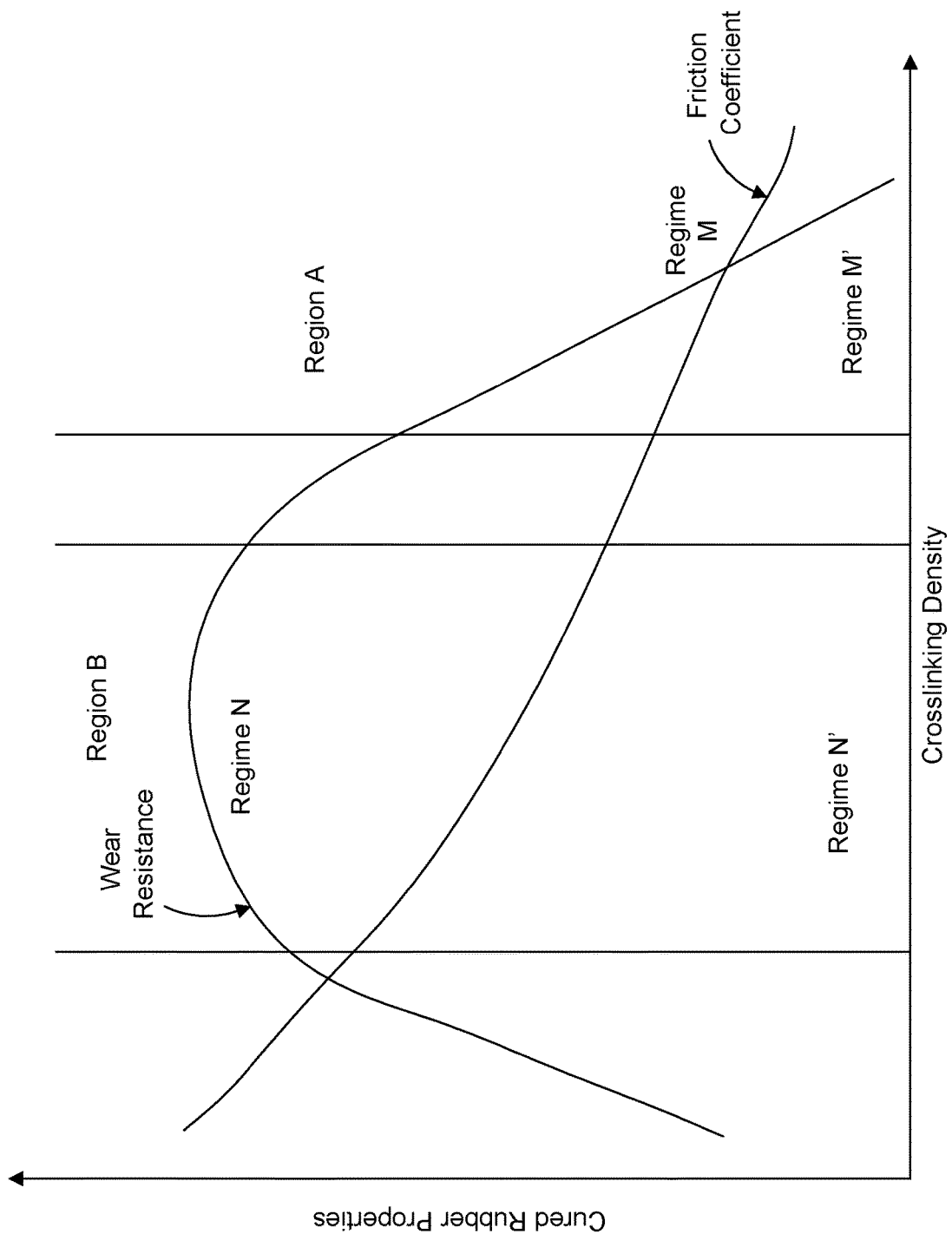
FIG. 6B presents a plot of friction coefficient and a plot of wear resistance of a cured rubber as a function of crosslinking density.

The two plots in FIG. 6B represent: the wear resistance and the friction coefficient of a cured rubber as a function of crosslinking density. While the friction coefficient decreases as crosslinking density increases, the wear resistance plot shows a maximum regime (labeled N on the wear resistance curve). Wishing to prepare the O-ring of FIG. 2, for instance, in which region A of the O-ring has a low friction coefficient (regime M on the friction coefficient curve), while region B has good wear resistance (regime N on the wear resistance curve) will entail selecting fabrication, e.g., vulcanization, conditions resulting in relatively high crosslinking density (regime M' on the horizontal axis) for region A, and lower crosslinking density (regime N' on the horizontal axis) for region B of the O-ring.

Figure 6C:
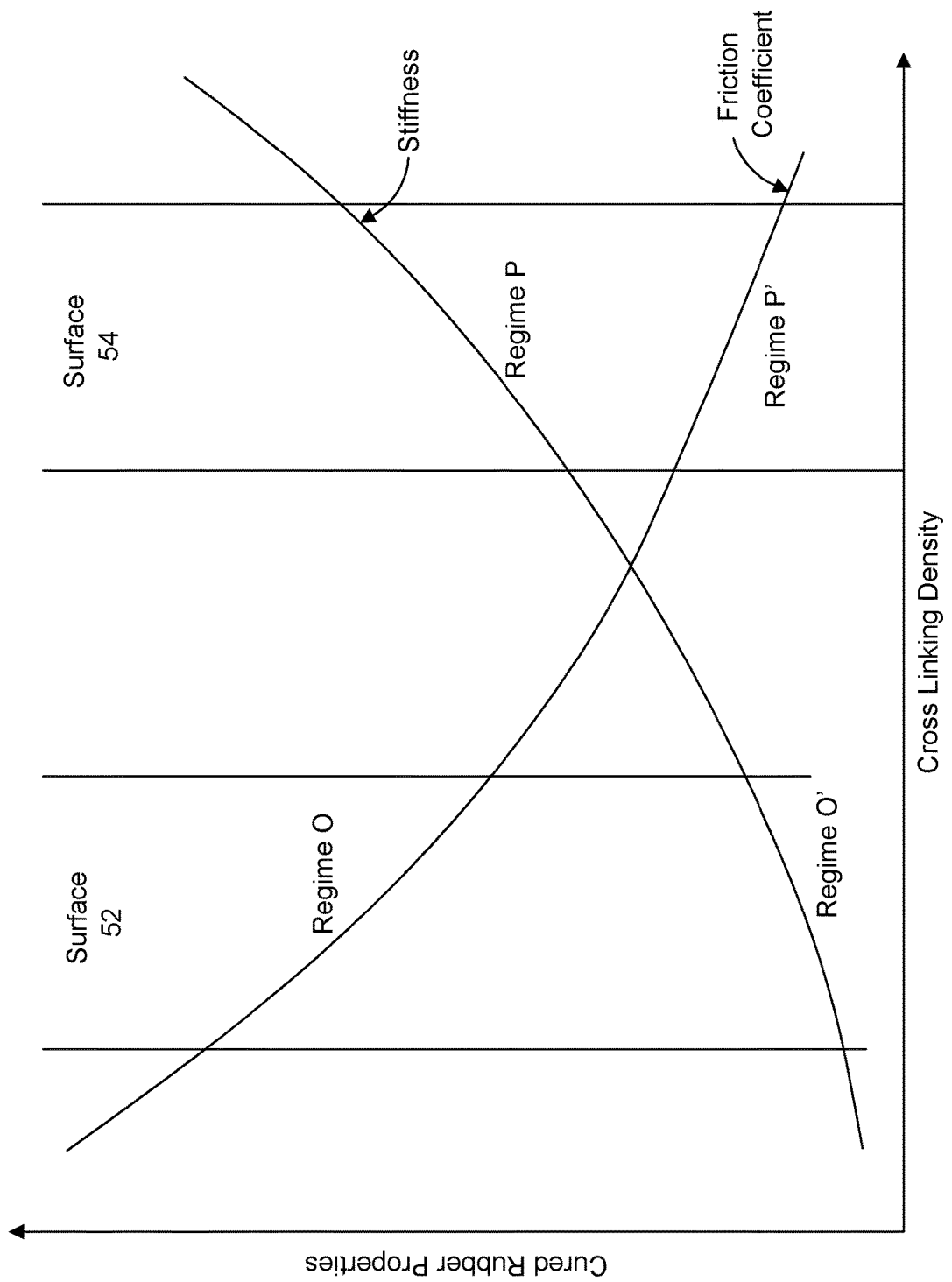
FIG. 6C presents plots of the friction coefficient and the stiffness of a cured rubber as a function of crosslinking density.

In another illustration, a conveyor belt (FIG. 5) can be prepared by examining the two plots in FIG. 6C, namely the friction coefficient and the stiffness of cured rubber as a function of crosslinking density. A crosslinking density in regime O', resulting in a relatively high friction coefficient (e.g., within regime O on the friction coefficient curve), can be beneficial for upper surface 52, while a crosslinking density in regime P' may be preferred for generating the relatively high stiffness (e.g., within regime P on the stiffness curve) desired for bottom surface 54.

Correlations described above can be extended to include more than two plots, to prepare, for example, rubber parts that are more complex, parts that may benefit from displaying different properties in more than two regions.

Figure 6D:
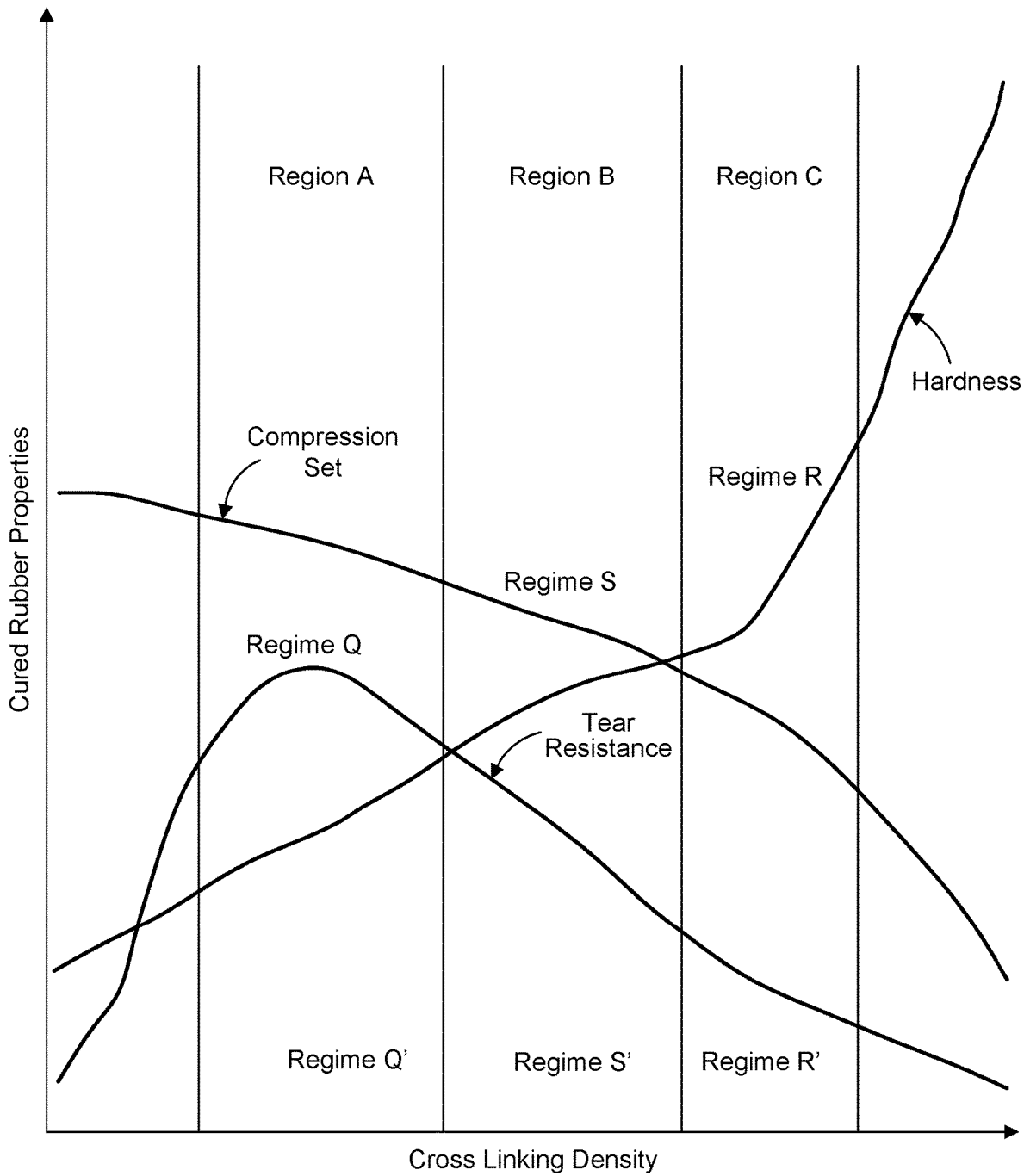
FIG. 6D presents plots of the compression set, hardness and tear resistance of a cured rubber as a function of crosslinking density.

The three plots in FIG. 6D represent: (i) the compression set, (ii) the hardness and (iii) the tear resistance of a cured rubber as a function of crosslinking density. While the compression set decreases as crosslinking density increases, the tear resistance plot shows a maximum regime (labeled Q on the tear resistance curve); hardness increases as crosslinking density increases.

Wishing to prepare the shaft-seal of FIG. 3, in which region C of the shaft-seal has a low compression set (regime R on the compression set curve); region B has a desired hardness (regime S on the hardness curve); and region C has good tear resistance (regime Q on the tear resistance curve), will entail selecting fabrication, e.g., vulcanization, conditions resulting in relatively high crosslinking density (regime R' on the horizontal axis) for region C, lower crosslinking density (regime S' on the horizontal axis) for region B of the shaft-seal, and the lowest crosslinking density (regime Q' on the horizontal axis) for region A of the shaft-seal.

Further correlations can be established between a selected crosslinking density (and thus a selected property) for a specific region in the rubber article and fabrication parameters, such as vulcanization conditions (e.g., temperature) to be provided at that region. Routine experimentation, operator's experience, modeling, etc. are some of the approaches that can be relied upon to determine and/or optimize fabrication parameters for specific portions of the rubber article being prepared.

Increasing the amount of energy supplied to a localized region during the fabrication of a rubber article, e.g., during curing, can be performed by providing additional heating to that region. Heating elements that can be employed include, heating coils, heating tapes, heating jackets, various types of heat exchangers, etc. It is also possible to cool certain regions during the vulcanization of the article. For example, heat insulating tape can be utilized to cover and protect some of the inner mold surfaces relative to others, as the article is being prepared. Similarly, if plates are used, a section of a uniformly heated plate can be covered with insulated tape. Thermoelectric cooling or heating devices based on the Peltier effect also can be employed in some cases.

In one example, a mold is provided with one or more heating element(s) placed at or near a surface in the mold cavity that corresponds to a region of relatively high crosslinking density in the rubber product. An illustration is described with reference to FIG. 7, which shows bottom mold plate 60 and top mold plate 62. Cavity 64 is shaped in the form of a desired rubber article prepared by vulcanizing elastomeric composition 66. An evaluation of the rubber article in service determines that the bottom region of the part, formed in recess 68, would benefit from enhanced hardness. The mold can then be provided with heating element 70, e.g., heating coils, heating tapes, heating plates, combinations thereof, arranged at or near the inner surfaces of recess 68, to ensure higher temperatures and thus higher crosslinking densities in the desired portion of the rubber product. Heating element 70 can be connected via cable 72 to a suitable power source 74. Thermocouples or other suitable devices can be used to monitor and/or control temperature. The process can be partially or completely automated, using, for instance, controller 76.

Figure 8:
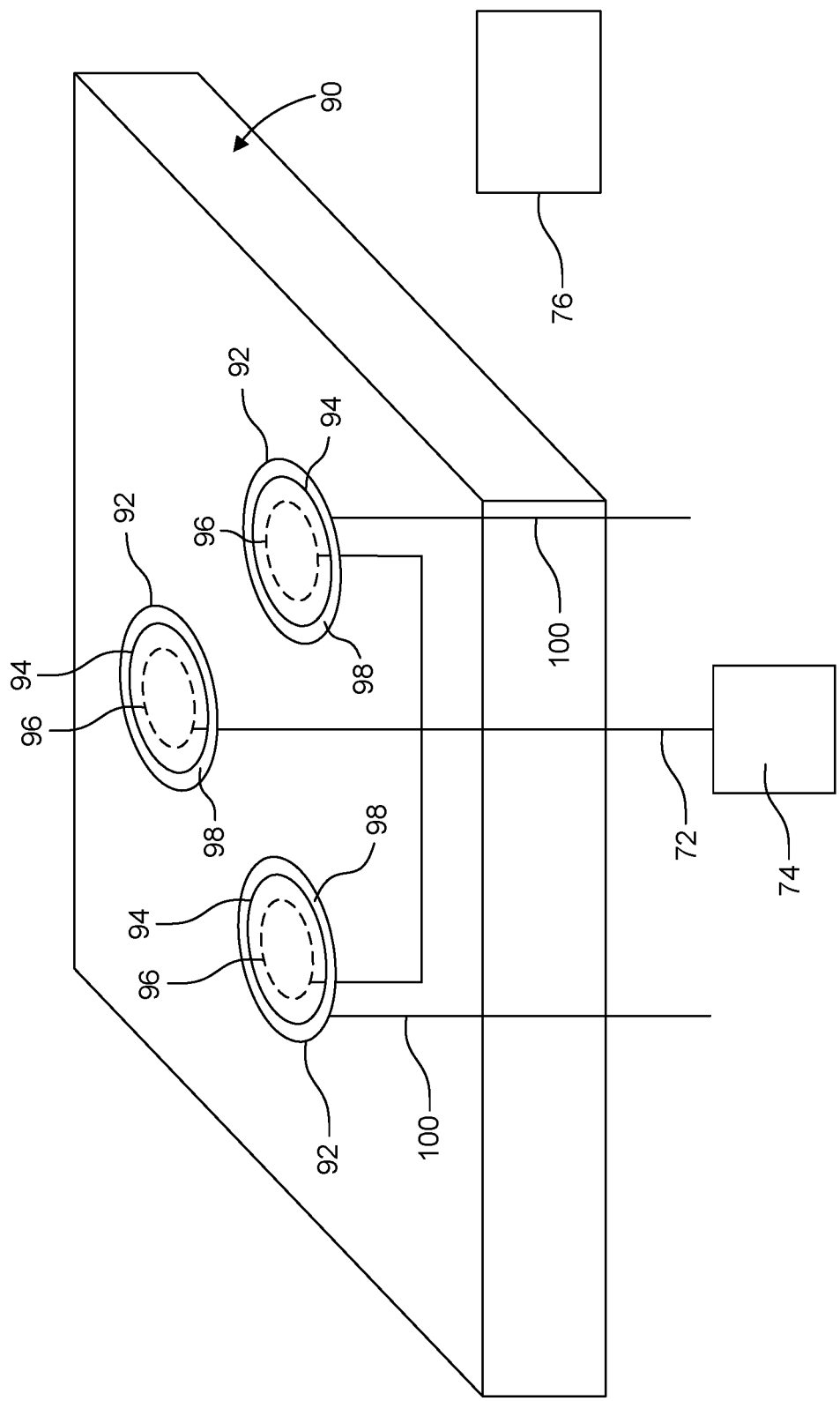
FIG. 8 is a view of a mold for fabricating rubber O-rings according to methods described herein.

FIG. 8 shows the bottom die 90 in an apparatus designed to vulcanize O-rings 92, which, based on a particular application, are found to benefit from an increase in crosslinking density at an inner region 94. To prepare the O-rings, plate 90 is provided with heating elements 96 at or near the inner circumference of recess 98, in which the elastomeric composition is to be cured. Heating elements 96 can be linked to one another (inside or outside the die) and supplied with current from power source 74 through cable 100. It is also possible to power each heating element 96 independently. Temperatures can be monitored and/or controlled using suitable sensors, e.g., thermocouples 100. As described above controller 76 can be employed in automated embodiments.

Selective heating using infrared (IR) radiation, microwaves, ultrahigh-high frequency waves, etc. also is possible in some cases.

In some embodiments, the mold employed during vulcanization is provided with a heating system conventionally arranged to transfer heat to the entire vulcanizable composition in the mold. Such an arrangement can be modified or adapted to permit raising the temperatures of certain sections of the heating system (thereby increasing the crosslinking density) relative to other sections of the heating system. In a different approach, a region designed to impart a lower crosslinking density can be insulated from the heating system, thus lowering the temperature experienced by the corresponding region of the rubber compound being cured in the mold.

Principles described herein also can be implemented in extrusion and following (subsequent) curing. In such processes, vulcanization can begin as the composition passes through a die and can continue in air or a liquid, e.g., a salt bath.

To manufacture a rubber part according to embodiments of the invention, a temperature differential can be applied at the extrusion die. For instance, lower heating can be provided at a first die surface (for less crosslinking), while increased heating (for enhanced crosslinking) is supplied at a different (second) die surface. In another approach, a section of a uniformly heated die is covered with insulating tape to lower the exposure temperature onto the rubber being extruded.

Figure 4:
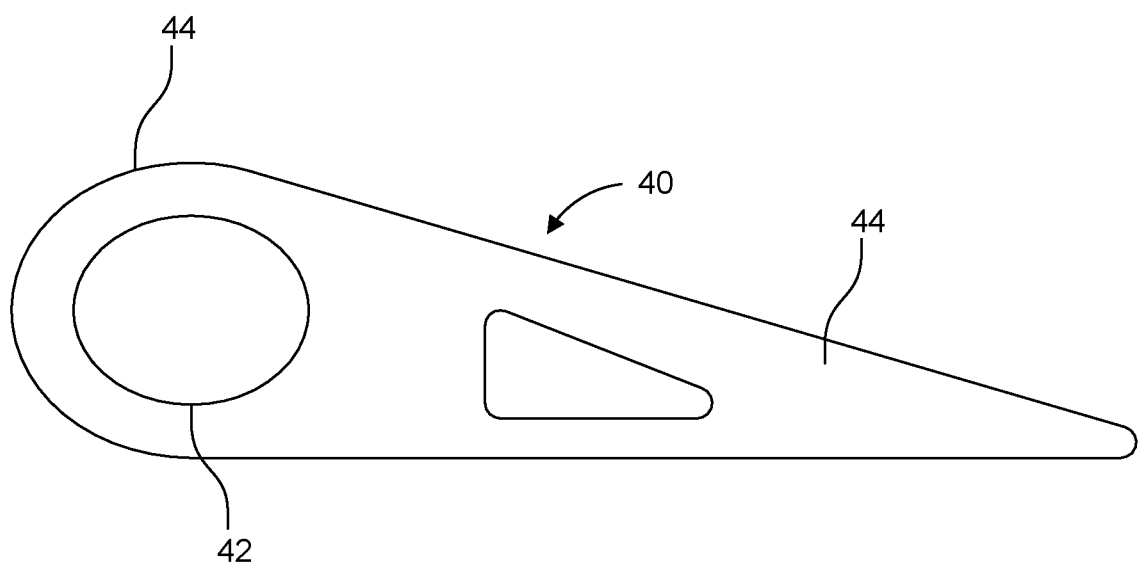
FIG. 4 is a view of an extruded rubber profile having regions exhibiting different properties.

One implementation employs a removable insulating tape that is co-extruded with the article (e.g., a profile such as that in FIG. 4). The extrudate is directed to a salt bath characterized by typical parameters associated with the specific process employed. The speed with which the extruded profile is transported within the salt bath can be adjusted to ensure the desired exposure (curing) time, e.g., a few minutes. The heat insulating tape can be stripped off at the exit from the salt bath and the article can then be conveyed to a cooling bath.

In further embodiments, rubber parts are continuously vulcanized, while being transported (conveyed) through a microwave tunnel. The microwave field, typically an ultra-high frequency field (UHF), is modified for nonuniformity, to alter its intensity in a specific section of the tunnel relative to another section. To prepare the EPDM profile of FIG. 4, for instance, with a lower crosslinking density (lower hardness, better sealing) being desired in area 44 of the article, and higher crosslinking density (higher hardness, lower compression set, better connection with a metal component) in area 42, the ultra-high frequency (UHF) field is modified to ensure a higher heating in the desired higher crosslinking area and lower heating in the desired lower crosslinking area. The exact parameters of the heterogeneous (nonuniform) UHF field and the speed of conveying the part through the microwave tunnel can be determined by process validation.

For radiation curing, a suitable rubber composition can be shaped (e.g., in a mold, by extrusion) and then subjected to uneven radiation, depending on the degree of crosslinking targeted in one region versus another. Miniaturized parts having a first desired property in a first region and a different (second) property in a second region, can be fabricated by selectively applying a laser beam for different time periods or at different intensities, depending on the crosslinking density to be obtained in the different regions. Stenciling is yet another method that can be employed.

Principles described herein also can be applied or adapted to manufacturing techniques that employ 3D printing, an additive process in which a material (a solidifiable substance such as a polymer, for instance) is deposited, joined or solidified under computer control, to create a three-dimensional object, typically layer by layer. In some embodiments, 3D printing conditions are adjusted to modify the crosslinking density in a specific region of the intended article relative to another region. For example, a specific temperature, printing speed, and/or another parameter can be selected to impart a desired crosslinking density as layers or layer sections are deposited to form one portion of the article, while different process conditions can be chosen to deposit layers or layer sections that form another portion of the article. Alternatively, or in addition, the composition used to deposit the layers can be modified to generate distinct crosslinking densities in the intended article. Different curing systems can be employed, for instance. In another example, the filament material itself (e.g., a suitable polymer system) can be changed as a function of the desired crosslinking density. Desired adjustments (conditions, composition, etc.) can be addressed in the algorithm controlling the 3D printing, for complete automation of the process.

Various 3D printing processes, typically characterized by the manner in which the layers are deposited to create an article, and the materials utilized, have been and continue to be developed. ISO/ASTM52900-15, for instance, describes the following additive manufacturing (AM) processes: binder jetting, directed energy deposition, material extrusion, material jetting, powder bed fusion, sheet lamination, and vat photopolymerization.

Among the common methods currently used, fused deposition modeling (FDM) involves extruding a thermoplastic polymer in the form of filament through a heated nozzle. The polymer is melted and applied onto a platform. As the droplets solidify, the intended object is built, layer-by-layer from the bottom to the top, until the object is completed. In one implementation, the nozzle can be heated to different temperatures, thereby generating regions of distinct crosslinking densities.

Stereolithography (SLA) methods rely on photopolymerization (curing of photo-reactive polymers or resins when exposed to visible or ultraviolet light, typically produced by a laser. A first thin layer (25-100 µm) of resin between the bottom of the resin reservoir and a support is cured under the light according to a cross-section of the object that needs to be printed. The support then lifts the object and new resin flows underneath the first layer and is illuminated by the polymerizing radiation, forming the next cross-section of the object. The process repeats, building the object from top to bottom, until the task is completed. Curing parameters or promoting additives can be adjusted to produce regions having distinct crosslinking densities.

Laser sintering (SLS), another common 3D printing approach, relies on a high-power laser to sinter small particles of polymer or metal powder into a solid structure. The unfused powder can be used to support the part during printing and eliminates the need for dedicated support structures. Process conditions can be adjusted to form regions of differentiated crosslinking densities.

Nonplanar 3D printing and slicing software are being developed and these approaches too can be used in some cases.

Rubber products prepared as described herein can be tested for properties such as: density, hardness, stress-strain properties, tear resistance, dynamic properties, abrasion and wear, adhesion, as well as various ageing tests. In addition, there are standard tests for rubber products, e.g. tires, automotive parts, rubber rollers, hoses, conveyor belts and so forth. Most widely used rubber processing characteristic tests include rheometry/curemetry, Mooney viscosity and scorch, and dispersion.

Many standardized methods have been developed, providing uniformity in testing procedures. The ASTM D11 Committee, for example, is responsible for more than 200 standards for rubber compounds. Specific examples include but are not limited to: ASTM D2240-15(2021) *Standard Test Method for Rubber Property—Durometer Hardness*; ASTM D412-16(2021) *Standard Test Methods for Vulcanized Rubber and Thermoplastic Elastomers-Tension*; ASTM D395-18 *Standard Test Methods for Rubber Property-Compression Set*. ISO, DIN, BS, GOST and standards from other countries exist as well. Internal operating procedures (SOPs) also can be developed for some measurements.

Techniques such as these can be applied or adapted to test specific regions of the rubber article in some cases. For instance, a non-destructive hardness test can be conducted in a specific portion of a rubber part. In other approaches, products prepared according to embodiments described herein can be characterized by evaluating their performance relative to a comparative article, for example a conventional article in the manufacture of which no attempt was made to develop different crosslinking densities according to needs in specific regions.

The invention is further illustrated by the following nonlimiting examples.

EXAMPLE 1

A composition for preparing an automotive shock absorber has the components listed in Table 1.

TABLE 1

| Ingredient | Phr | Mixing stage # |
|---|---|---|
| Natural Rubber SIR-20 | 100 | 1 |
| Process Oil | 5 | 1 |
| Stearic Acid | 2 | 1 |
| Zinc Oxide | 5 | 1 |
| N339 Carbon Black | 50 | 1 |
| Phenylamine Antioxidant | 1.5 | 1 |
| Sulfur | 2.5 | 2 |
| Cure accelerator benzothiazyl disulfide | 1 | 2 |
| Cure accelerator TMTD | 0.1 | 2 |
| Total | 167.1 | |

Mixing is conducted in an internal mixer, in a two-stage approach—stage 1: drop at 160° C.; stage 2: drop at 110° C. Cold mill rolling is conducted for 3 minutes; the process requires an 8-hour relaxation period at room temperature prior to vulcanization.

An analysis of the shock absorber during service indicates different properties/requirements at the inner surface compared to the outer surface of the article. Correlations between the desired properties and crosslinking density point to the vulcanization conditions to be modified. A shock absorber is prepared by applying different vulcanization conditions at the inner surface relative to the vulcanization conditions being applied at the outer surface. The resulting article is then compared to an article prepared conventionally.

In more detail, the comparative (conventional) shock absorber A is prepared by vulcanization of the entire article at 150° C. for 20 minutes. For shock absorber B (according to embodiments of the invention), the outer surface (B1) is vulcanized at 160° C., while the inner surface (B2) is vulcanized at 145° C. Properties are shown in Table 2. Stress-strain properties are tested on equivalent cured flat surfaces.

TABLE 2

| Property, ASTM Test | A | B1 | B2 |
|---|---|---|---|
| Hardness, Shore A, ASTM D2240 | 60 | 55 | 30 |
| 300 Modulus, MPa, ASTM D412 | 11 | 18 | 12 |
| Tensile Strength, MPa, ASTM D412 | 25 | 28 | 25 |
| Elongation at Break, %, ASTM D412 | 550 | 400 | 650 |
| Service Cycles, minutes, internal SOP | 1.1 | 1.65 | |

To summarize, shock absorber B displays properties that differ at the inner and outer surfaces. These properties are obtained by localized modifications in the vulcanization temperature and thus changes in the crosslinking densities. As a result, practicing aspects of the invention can increase the service cycle.

EXAMPLE 2

This example relates to the manufacture of a nitrile butadiene rubber (NBR) shaft seal. A typical composition is shown in Table 3.

TABLE 3

| Ingredient | Phr | Mixing stage # |
|---|---|---|
| Europrene N3330 | 100 | 1 |
| ZnO | 5 | 1 |

TABLE 3-continued

| Ingredient | Phr | Mixing stage # |
|---|---|---|
| Stearic Acid | 1 | 1 |
| N351 Carbon Black | 40 | 1 |
| Plasticizer Emoltene | 5 | 1 |
| Mistron Vapor | 25 | 1 |
| Graphite | 10 | 1 |
| Coumarone resin | 2 | 1 |
| Naugard 445 | 1.5 | 1 |
| Vulkanox MB2 | 1.5 | 1 |
| Sulfur | 0.4 | 2 |
| CBS accelerator | 1.5 | 2 |
| Cure accelerator TMTD | 2.5 | 2 |
| Total | 195.4 | |

Mixing is performed in two stages. Stage 1 is conducted in the internal mixer, the drop temperature being 150° C. The curatives are added on mill in stage 2. Additional milling on a cold mill is conducted for 3 minutes. Also provided is a minimum relaxation of 4 hours at room temperature prior to vulcanization.

A comparative shaft seal C is prepared by conventional techniques, vulcanizing the entire article at 170° C. for 10 minutes.

Shaft seal D is prepared according to embodiments described herein. Having established desired properties in distinct regions of the article, the lip area (D1) is vulcanized at 160° C. for 10 minutes for relatively moderate crosslinking, to enhance fatigue resistance, while connection area (D2) is vulcanized at 175° C. for 10 minutes, for increased crosslinking, (enhancing stability, reducing compression set).

The properties obtained are listed in Table 4. Stress-strain properties and Compression set are tested on equivalent cured flat surfaces.

TABLE 4

| Properties, ASTM Test | C | D1 | D2 |
|---|---|---|---|
| Hardness, Shore A ASTM D2240 | 70 | 65 | 80 |
| 300% Modulus, Mpa ASTM D412 | 17.3 | 16.1 | 22.1 |
| Tensile Strength, Mpa ASTM D412 | 20.8 | 18 | 23 |
| Elongation at Break, % ASTM D412 | 450 | 550 | 400 |
| Compression set 22 h, 100 C, %, ASTM D395 | 28 | 34 | 25.2 |
| Swelling in ASTM #3 oil, 70 hr, 100o C., %, ASTM D471 | 5 | 6 | 4 |
| Swelling in Fuel B, 70 hr, 100° C., % | 26 | 32 | 22 |
| Service cycles, in mln, internal SOP | 2.5 | 3.8 | |

As seen in Table 4, shaft seal D provides properties that differ from region D1 to region D2 and displays a higher service cycles relative to the conventional seal shaft C.

EXAMPLE 3

An extruded EPDM profile is prepared using the composition shown in Table 5.

TABLE 5

| Ingredient | Phr | stage # |
|---|---|---|
| Keltan 5508 | 100 | 1 |
| Sunpar oil 2280 | 155 | 1 |
| Stearic Acid | 1 | 1 |
| Zinc Oxide | 5 | 1 |
| N650 Carbon Black | 200 | 1 |

TABLE 5-continued

| Ingredient | Phr | stage # |
|---|---|---|
| Parrafin Wax | 5 | 1 |
| Sulfur | 1.5 | 2 |
| MBTS ACCELERATOR | 1.5 | 2 |
| ZBDC | 2 | 2 |
| Cure acceleratorTMTD | 0.5 | 2 |
| Total | 471.5 | |

In a typical process, stage 1 and stage 2 operations are conducted in an internal mixer. In stage 1, the drop temperature can be about 165° C. In stage 2 the drop temperature can be about 115° C. Milling on a cold mill can take 3 minutes and the minimum relaxation, at room temperature, can last 4 hours.

The article is evaluated (in terms of demands placed on various regions during service, for example) and it is established that beneficial effects could be obtained by having a first surface that is relatively soft and a second, harder surface.

To manufacture a profile according to embodiments of the invention, the extrusion die temperature is 140° C. on the area shaping the hard surface; the extrusion die temperature is 110° C. on the area shaping the soft surface. A heat insulating strippable tape is coextruded on the area of the desired softer surface. The extruded profile is conveyed directly into a salt bath having a temperature of 190° C. The speed of conveying within the salt bath is determined to ensure the exposure (curing) time of 5 min. The heat insulating tape is stripped off at the exit and the profile is conveyed into the cooling bath.

Table 6 lists properties of a conventional EPDM, article E, prepared by exposing the entire article to a stage 1 vulcanization temperature of 160° C. for 20 minutes. In contrast, soft surface F1 of an article F, prepared according to embodiments of the invention, is vulcanized at 150° C. for 20 minutes; hard surface F2 of article F is at 170° C. for 20 minutes. The resulting properties (tested on equivalent cured flat surfaces) are listed in Table 6. The change in hardness is determined by measurements before and after oven aging (70 hours at 100° C.).

TABLE 6

| Properties | E | F1 | F2 |
|---|---|---|---|
| Hardness, Shore A, ASTM D2240 | 59 | 50 | 69 |
| 300% Modulus, Mpa ASTM D412 | 5.2 | 4.4 | 5.9 |
| Tensile Strength, Mpa ASTM D412 | 9.3 | 8.5 | 9.8 |
| Elongation at Break, % ASTM D412 | 570 | 620 | 490 |
| Compression set 22 h, 70 C., % ASTM D395 | 28.3 | 29.4 | 25.1 |
| Oven aging 70 hr 100 C. | | | |
| Hardness change ASTM D2240 | 6 | 6 | 3 |

As can be observed from Table 6, the region of the profile (F1) that is vulcanized at lower heat exposure demonstrates lower hardness, thus better sealing capability, while providing aging properties similar to the control E. On the other side, region F2, that is cured with higher heat exposure, provides higher hardness and lower compression set, which is beneficial for connection with a metal component.

While this invention has been particularly shown and described with references to preferred embodiments thereof, it will be understood by those skilled in the art that various changes in form and details may be made therein without departing from the scope of the invention encompassed by the appended claims.

What is claimed is:

1. A process for producing a rubber article, the process comprising:
   selecting fabrication conditions to increase or decrease the crosslinking density in a first region of the rubber article relative to a second region of the article, wherein the first region and the second region are prepared from the same rubber composition, using the same curing system, and wherein both the first region and the second region undergo crosslinking to produce the rubber article,
   wherein, the crosslinking density is increased in a first region by increasing an electromagnetic energy supplied to the first region relative to that supplied to the second region, or
   wherein, the process is conducted in a nonuniform microwave field.

2. A process for producing a rubber article, the process comprising:
   selecting fabrication conditions to increase or decrease the crosslinking density in a first region of the rubber article relative to a second region of the article, wherein the first region and the second region are prepared from the same rubber composition, using the same curing system, and wherein both the first region and the second region undergo crosslinking to produce the rubber article, wherein the crosslinking density is reduced in the first region by covering a section of a mold surface in contact with the first region with insulating tape or by co-extruding a rubber composition and a removable tape, wherein the removable tape covers the first region.

3. A process for producing a rubber article, the process comprising:
   curing an elastomeric composition in a mold or extruding the elastomeric composition through a die, wherein the mold or the die includes a first section and a second section; and
   supplying more energy to the first section than to the second section, thereby producing a rubber article having a crosslinking density that is higher in a first region formed in the first section than in a second region formed in the second section.

4. The process of claim 3, wherein the first region has a hardness that is higher relative to the second region.

5. The process of claim 3, wherein the first section is heated to a higher temperature relative to the second section.

6. The process of claim 3, wherein the second section is covered with removable tape.

7. A process for producing a rubber article, the process comprising:
   coextruding a rubber composition and a removable insulating tape to form an extrudate covered with the removable insulating tape;
   conveying the extrudate covered with the removable insulating tape to a salt bath; and
   removing the removable insulating tape to produce a rubber article having a lower crosslinking density in the area that had been covered by the removable insulating tape.

8. A rubber article produced by the process of claim 7.

9. A process for producing a rubber article, the process comprising:
   evaluating a control rubber article to determine a first region exposed to a first service environment and a second region exposed to a second service environment;

modifying the crosslinking density in the first region relative to the second region to obtain a rubber article having a first cured region and a second cured region, the first and the second cured regions having different cured rubber properties, wherein modifying the crosslinking density in the first region relative to the second region is obtained by exposing the first region and the second region to different vulcanization conditions, wherein the different vulcanization conditions are produced by a non-uniform microwave field, or wherein the process is a 3D printing process.

* * * * *